United States Patent [19]
Tighe

[11] Patent Number: 5,335,930
[45] Date of Patent: Aug. 9, 1994

[54] CONSTRUCTION SITE HAULING SYSTEM

[76] Inventor: Peter Tighe, 22 Timmins Rd., Bow, N.H. 03304

[21] Appl. No.: 986,851

[22] Filed: Dec. 4, 1992

[51] Int. Cl.⁵ ............................................. B60D 1/06
[52] U.S. Cl. ................................. 280/477; 280/432; 280/475
[58] Field of Search ............... 280/432, 477, 475, 507, 280/763.1

[56] References Cited

U.S. PATENT DOCUMENTS

| | | | |
|---|---|---|---|
| 3,734,539 | 5/1973 | Salmi | 280/477 |
| 3,765,703 | 10/1973 | Voelkerding et al. | 280/475 X |
| 3,976,284 | 8/1976 | Hupp | 259/168 |
| 4,113,274 | 9/1978 | Vahrenkamp | 280/475 |
| 4,133,552 | 1/1979 | Sheine | 280/446 |
| 4,253,680 | 3/1981 | Albright et al. | 280/479 |
| 4,313,264 | 2/1982 | Miller, Sr. | 33/264 |
| 4,560,183 | 12/1985 | Cook | 280/477 |
| 4,666,176 | 5/1987 | Sand | 280/477 |
| 4,674,942 | 6/1987 | Assh et al. | 414/483 |
| 4,723,788 | 2/1988 | Suter | 280/477 |
| 4,863,184 | 9/1989 | Mena | 280/763.1 X |
| 4,898,400 | 2/1990 | Elkins | 280/475 X |
| 4,958,978 | 9/1990 | Shedleski | 280/433 X |

OTHER PUBLICATIONS

Caterpillar, Inc. Catalog, "Caterpillar Product Line" (Mar. 1988).

Primary Examiner—Margeret A. Focarino
Assistant Examiner—Victor E. Johnson
Attorney, Agent, or Firm—Peter J. Manus

[57] ABSTRACT

A hauling system for a self-propelled vehicle and a trailer that is not self-propelled in which the self-propelled vehicle and the trailer are releasably connected by a system that is operable by a single operator who can align and connect the self-propelled vehicle and the trailer from the cab of the self-propelled vehicle. Lateral alignment is achieved by steering the self-propelled vehicle and is facilitated by masts located on the self-propelled vehicle and the trailer that are visible from the cab. Vertical alignment and the physical connection are completed through use of a jack or other lifting mechanism that is positioned on the trailer and is operated by a wireless control signal sent from the cab.

20 Claims, 4 Drawing Sheets

CONSTRUCTION SITE HAULING SYSTEM

BACKGROUND OF THE INVENTION

This invention relates to hauling systems, and more specifically to systems for hauling loose bulk material at a construction site using a self-propelled vehicle ordinarily found on the site that can be used to propel a trailer that is not self-propelled. The self-propelled vehicle can be attached to or disconnected from the trailer by the driver of the self-propelled vehicle, without assistance and without exiting from the cab of the self-propelled vehicle.

The movement of materials, gravel, dirt, and the like at construction sites is a common problem. Common solutions involve the use of special hauling vehicles such as self-propelled dump trucks, to complement a front wheel loader or steam shovel that is used to excavate and to lift and load debris. These solutions work well, but require the capital cost of a second heavy duty vehicle, plus the operation cost of a second driver, in addition to what is required for the loader or steam shovel.

Another common solution is to load debris into a dumpster. This requires the hiring of a waste service. Also, the dumpster is stationary on the site. This solution is not well suited to moving material around at a site, as is often required.

Generally, a wide variety of hauling systems are well known, ranging from railroad trains to pickup trucks, tractor trailer trucks, and sophisticated refuse pick up and hauling trucks.

In hauling systems involving a tractor and a trailer, the tractor and the trailer should connect with relative ease. In existing hauling systems, it is often necessary for the operator of the tractor to rely on an observer to direct the tractor into alignment with the trailer, so that the two vehicles can be connected. Even where some form of alignment mechanism is used that is visible from the cab of the tractor, so as to permit the operator to align the vehicles alone, as in Miller, U.S. Pat. No. 4,313,264; Surer, U.S. Pat. No. 4,723,788; or Sand, U.S. Pat. No. 4,666,176, it is generally necessary for the operator to exit from the tractor in order to physically connect the tractor to the trailer. In those systems that permit the vehicles to be connected without the operator exiting from the tractor, such as Cook, U.S. Pat. No. 4,560,183, the operator must still exit from the tractor in order to dismantle the connecting mechanism once the vehicles are connected, in order to permit complete freedom of movement of the tractor and trailer in combination.

Another deficiency in existing systems, such as described in Cook, is that they will not function if the rear of the tractor and front of the trailer are out of vertical alignment. This will be the norm with many trailers, in which the front end leans against the ground unless jacked up. It also will occur, for example, if the trailer holds an uneven load that causes the front of the trailer to sink relative to the rear of the trailer, and hence come out of vertical alignment with the rear of the tractor. None of the existing systems provide a means for adjusting the vertical position of the trailer from within the tractor, when the trailer is not vertically aligned with the tractor.

In other existing systems, such as Sheine, U.S. Pat. No. 4,133,552, in addition to requiring an operator to leave the tractor, the mechanism that permits the two vehicles to be connected requires extensive connections between the two vehicles that must be completed by the operator or a second individual. This is inconvenient and inefficient if the vehicles are to be connected and disconnected frequently.

While these prior art hauling systems work well for certain applications, they are not easily used or economical for hauling debris and loose bulk material around a construction site, particularly a small site. They often require a specialized propelled vehicle that is used only for hauling and an operator for that vehicle. The prior art solutions also usually require the operator or an assistant to spend time outside the vehicle, which presents clear safety problems.

It is therefore an object of this invention to provide a hauling system in which a self-propelled vehicle can be connected to a trailer that is not self-propelled by a single operator who does not have to leave the self-propelled vehicle to align and connect or disconnect the vehicles.

It is also an object of this invention to provide a hauling system in which a self-propelled vehicle can be connected to a trailer that is not self-propelled in less time than has previously been necessary, and to permit a hauling operation to be performed more quickly.

It is a further object of this invention to provide a hauling system in which the functions of two separate vehicles can be utilized by a single operator positioned in one of the vehicles.

It is another object of this invention to provide a hauling system in which functions that previously required the use of two self-propelled vehicles can be utilized through the use of one self-propelled vehicle and a second vehicle that is not self-propelled and therefore does not require an engine to propel it and requires a significantly lower capital and operating expense.

It is yet another object of this invention to provide a hauling system in which two vehicles can be coupled, and operations involving the second vehicle controlled, without the need for additional connections, such as electrical, hydraulic, or pneumatic lines, running from the first vehicle to the second, other than what is required to keep the second vehicle secured to the first.

It is still another object of this invention to provide a hauling system that requires the use of one self-propelled vehicle and one vehicle that is not self-propelled, where both vehicles are easily modified versions of standard vehicles, and the self-propelled vehicle is of a type that is commonly utilized at construction sites.

SUMMARY OF THE INVENTION

In the present invention, a self-propelled tractor is releasably secured to a trailer that is not self-propelled through a connecting device secured in part to the rear of the tractor and in part to the front of the trailer. In one embodiment, the connecting device consists of a hook on the tractor that fits into a ring on the trailer to secure the tractor to the trailer. Alternatively, the hook could be on the trailer and the ring could be on the tractor. In a preferred embodiment, the tip of the hook is vertical and the ring is positioned in a horizontal plane.

The connecting device can be supplemented with a locking mechanism that prevents the tractor from disengaging from the trailer when the locking mechanism is engaged. In a preferred embodiment in which the connecting device consists of a hook and ring combination, and the hook is "J"-shaped, the locking mechanism can consist of a bar that prevents the ring from separating from the hook when the locking mechanism is engaged. When the locking mechanism is engaged, the bar is positioned in the space between the tip of the hook (and the ring) and the horizontal portion that makes up the top of the "J".

To permit an operator positioned in the cab to align the tractor with the trailer, the hauling system further includes an alignment system which can be observed by the operator from the cab. In a preferred embodiment, the alignment system consists of masts positioned on the tractor and the trailer and brightly colored balls positioned at the top of each mast which are visible from the cab. When the tractor is maneuvered so as to align the ball on the tractor mast with the ball on the trailer mast, the tractor and the trailer are aligned and can be connected. Alternatively, one or more other easily visible objects, such as flags, can be placed on the masts. These objects can be placed anywhere on the masts where they will be visible from the cab.

The hauling system also includes a lift mechanism for adjusting the vertical position of the trailer. The power source for the lift mechanism is mounted on the trailer. In one embodiment, the lift mechanism consists of a hydraulic jack, with an extendable piston positioned vertically which engages the ground. The lift mechanism permits vertical adjustment of the trailer both to align the tractor and trailer, and to engage the connecting device.

The lift mechanism is operable by a control system that includes a transmitter, operable from the cab of the tractor, that sends a wireless control signal to a receiver mounted on the trailer. The receiver produces a control signal to actuate the lift mechanism. In a preferred embodiment, the control system also operates the locking mechanism. The locking mechanism can be structured so as to operate synchronously with the lift mechanism, so that when the lift mechanism engages the connecting device it also engages the locking mechanism.

In one embodiment the tractor is a front wheel loader, and the trailer is a dump trailer.

DETAILED DESCRIPTION OF THE PREFERRED EMBODIMENTS.

Figure 1:
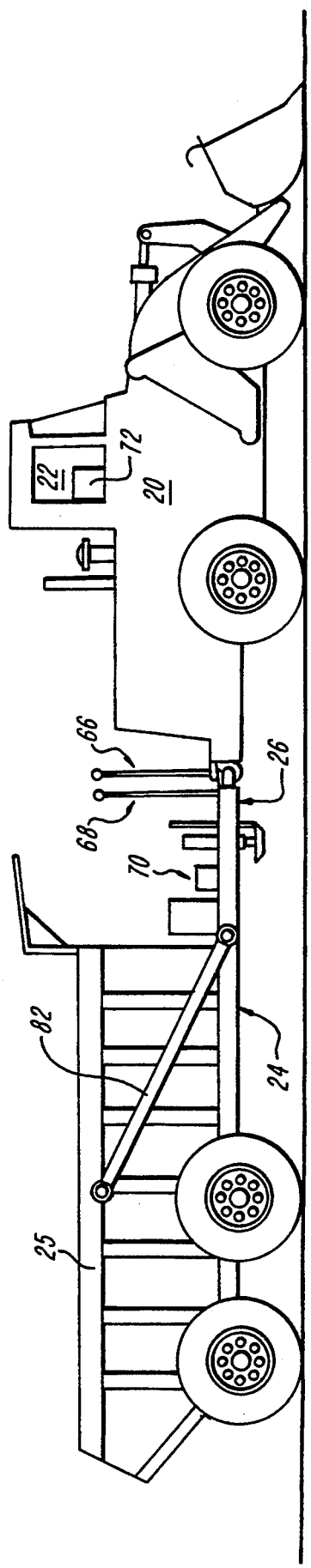
FIG. 1 is a view in side elevation of a preferred embodiment of a hauling system according to the present invention.
Figure 2:
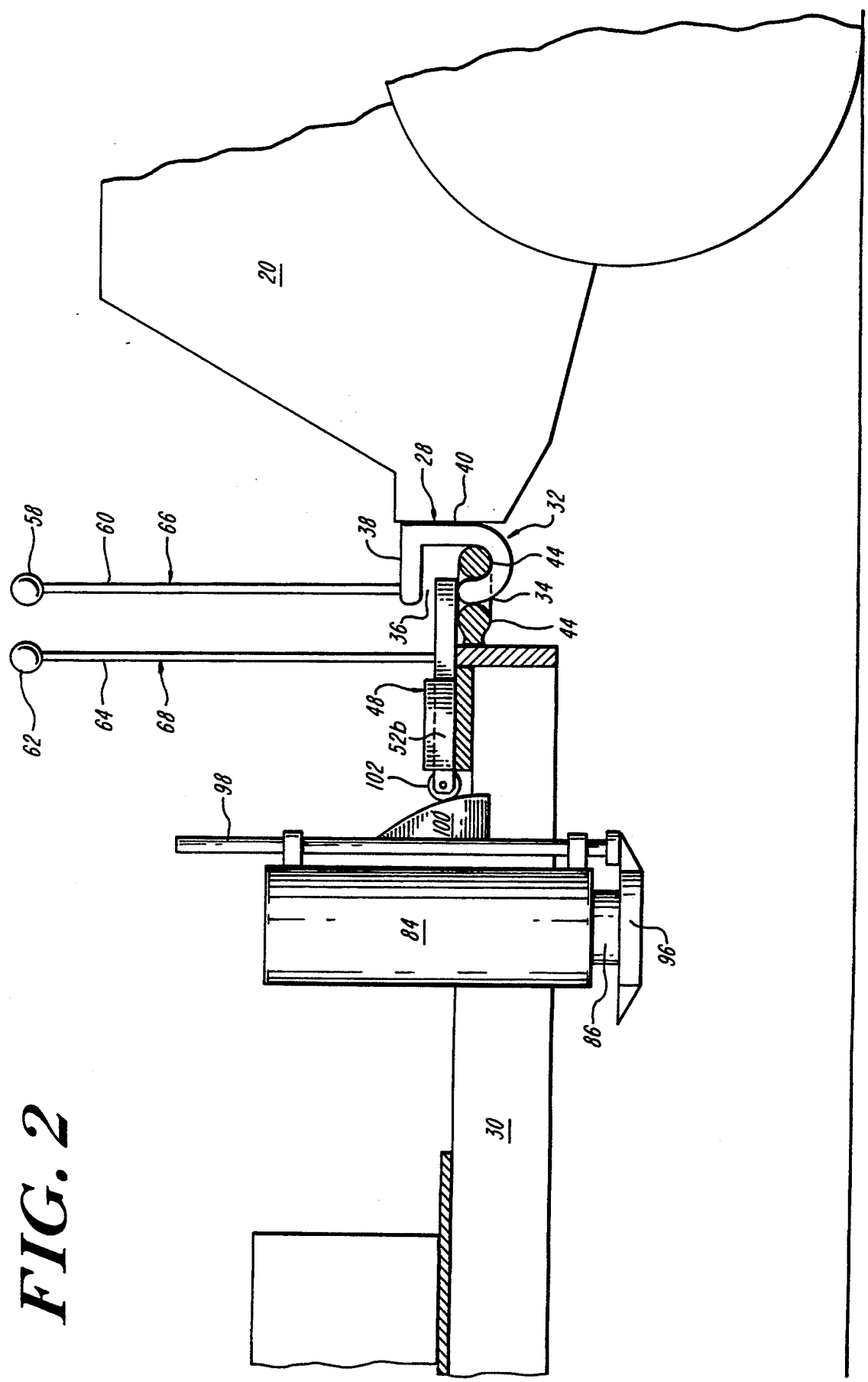
FIG. 2 is an enlarged view in side elevation of the system shown in FIG. 1, showing the locking mechanism engaged and the lift mechanism disengaged.
Figure 3:
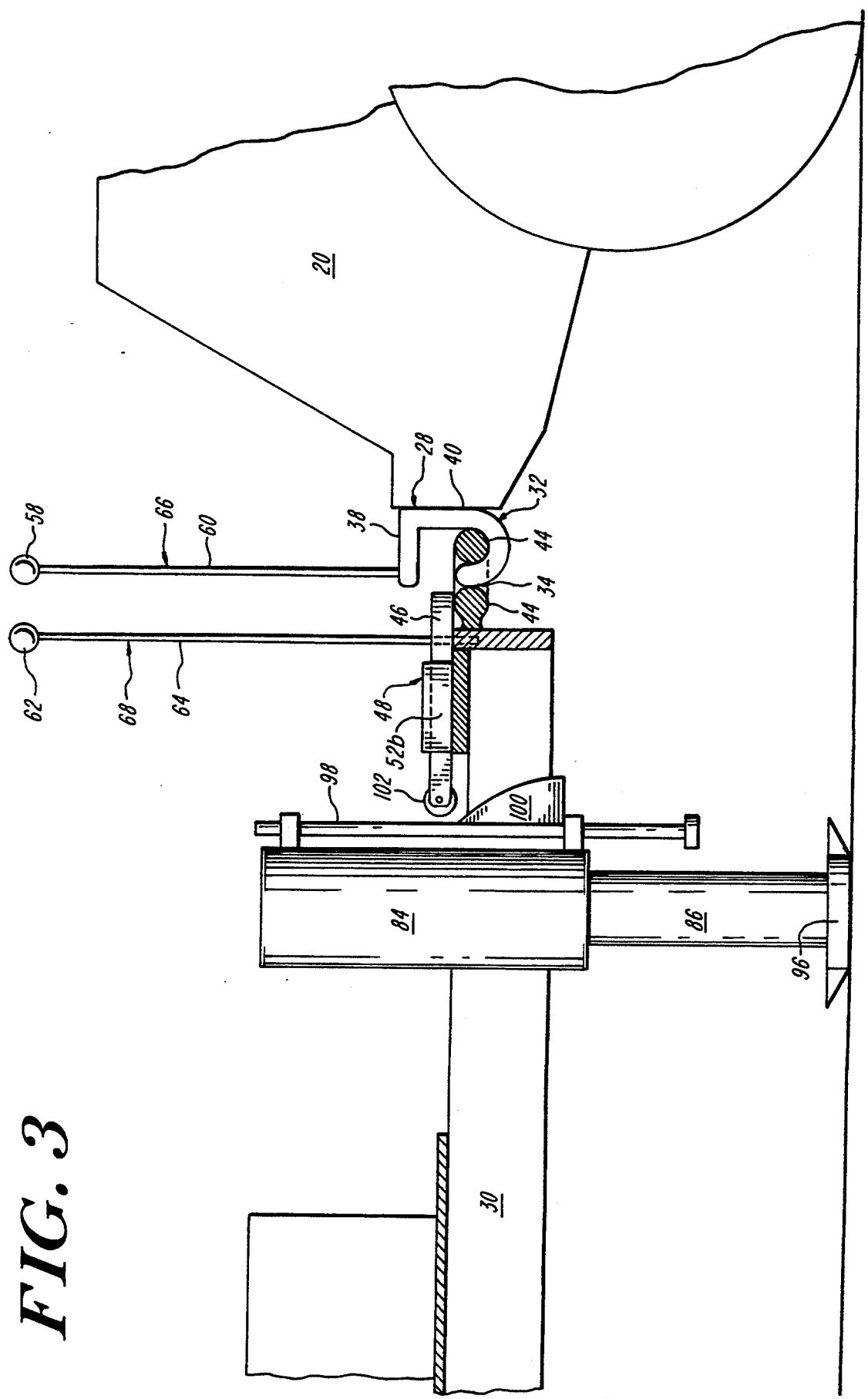
FIG. 3 is a view in side elevation of the system shown in FIG. 1, but with the locking mechanism disengaged and the lift mechanism lowered to engage the ground.

With reference to FIGS. 1, 2, and 3, a self-propelled front wheel loader 20 has a cab 22 in which a driver (not shown) operates the loader 20. In a preferred embodiment, the loader 20 is the Model 980C wheel loader sold by Caterpillar, Inc. of Peoria, Ill., which is modified through the addition of the loader portion 28 of hook-and-eye-type connecting device 26, loader mast 66, and transmitter 72, which are described below. Alternatively, similar wheel loaders commonly found at construction sites can be used.

The loader 20 is connected to a dump trailer 24, which is not self-propelled, by connecting device 26. In a preferred embodiment, trailer 24 is a four-wheeled off-road vehicle with a high ground clearance. It includes a load container 25, the front of which can be raised so as to dump debris or other materials placed in the load container 25. Alternatively, a trailer with a bulldozer suspension and a track-type under carriage can be used.

The trailer 24 contains the trailer portion 30 of the connecting device 26, locking device 48, trailer mast 68, and lift mechanism 70, which are described below. The connecting device 26, in connection with lift mechanism 70, permits the trailer 24 to be attached to and released from the loader 20 by the driver, without using an assistant or exiting from the loader 20. The lift mechanism 70 also is used to raise the load container 25.

The connecting device 26 includes a loader portion 28 and a trailer portion 30. The loader portion 28 comprises a "J"-shaped hook 32 in which one end is a tip portion 34, which is located at a vertical displacement across a gap 36 from a horizontal portion 38. The horizontal portion 38 connects to the tip portion 34 by a vertical portion 40.

The trailer portion 30 of the connecting device 26 includes a frame 42 (FIG. 4), at the end of which is a ring 44. The tip portion 34 of the hook 32 fits through the ring 44 to connect the loader 20 to the trailer 24. The trailer 24 is then secured to the loader 20 with locking bar 46. In the locked position, the locking bar 46 extends into the gap 36 between the tip portion 34 and the horizontal portion 38 of hook 32 (FIG. 2). This prevents ring 44 from disengaging from hook 32. In the unlocked position, locking bar 46 is retracted so that it does not extend into the gap 36 (FIG. 3). In such a position, ring 44 can move up from the tip portion 34, into the gap 36, and disengage from hook 32.

Figure 4:
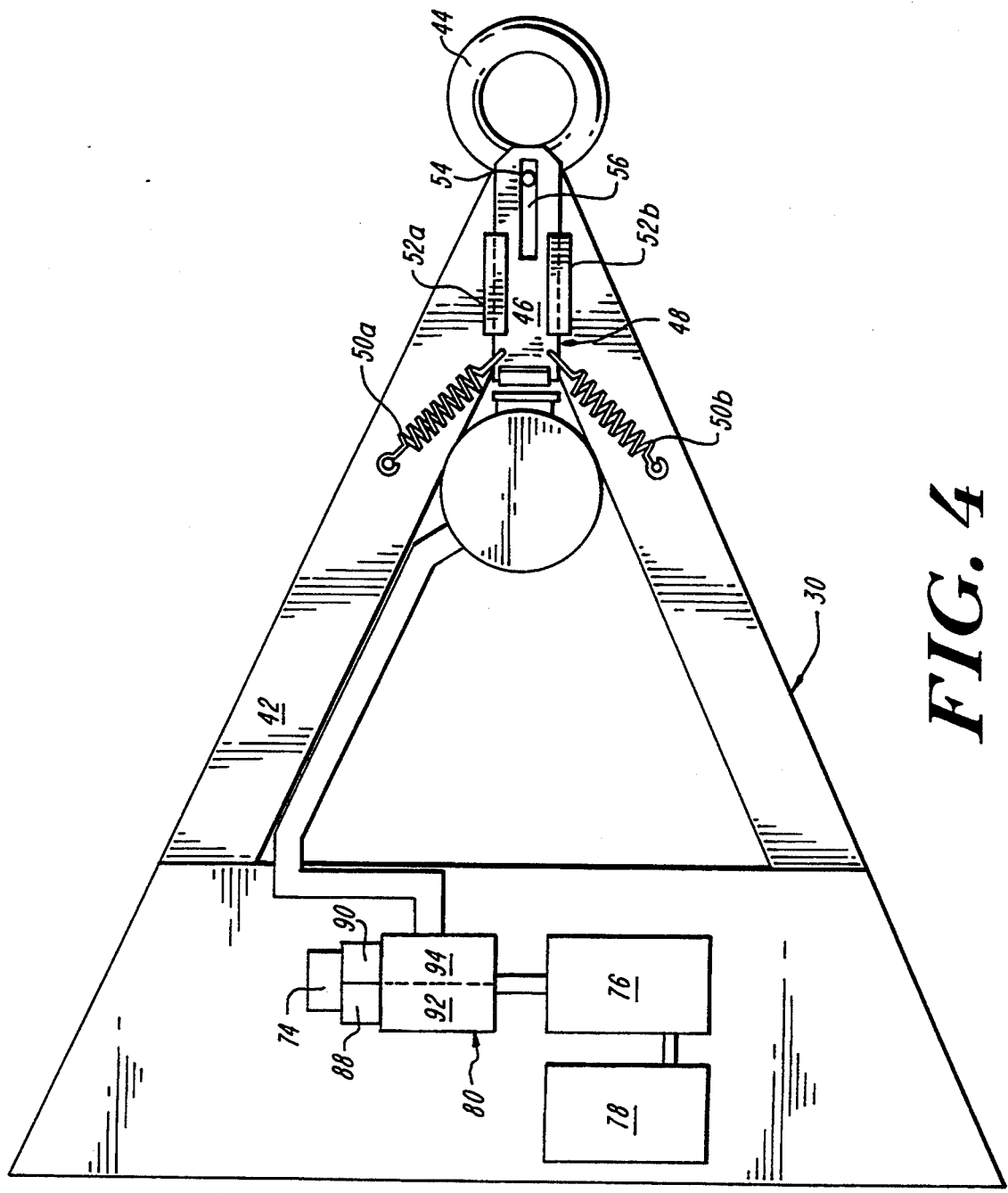
FIG. 4 is a top plan view of the connecting device shown in FIGS. 1-3.

With reference to FIG. 4, locking bar 46 is part of locking device 48, which is integrated with lift mechanism 70. Locking device 48 includes retractor springs 50a and 50b that exert a rearward force on locking bar 46 when locking bar 46 is in the locking or forward position. The movement of locking bar 46 is directed by guides 52a and 52b. Alignment rod 54, which fits into alignment slot 56 of locking bar 46 further ensures that locking bar 46 moves in the proper orientation.

Alignment of the loader 20 and the trailer 24 is achieved by aligning a first ball 58 on top of loader rod 60 with a second ball 62 on top of trailer rod 64. The loader rod 60 and first ball 58 make up loader mast 66, which is positioned on the loader portion 28 of the connecting device 26. The trailer rod 64 and second ball 62 make up trailer mast 68, which is positioned on the trailer portion 30 of the connecting device 26. Alternatively, the loader mast 66 can be positioned elsewhere on the loader 20 and the trailer mast 68 can be positioned elsewhere on the trailer 24. Because of the fixed positions of the first ball 58 and second ball 62 with respect to the hook 32 and ring 44, respectively, the driver can align the hook 32 and ring 44 longitudinally and laterally by moving the loader 20 so as to align the first ball 58 with the second ball 62. The loader mast 66 and trailer mast 68 can telescope. Instead of loader mast 66 and trailer mast 68, other pieces mounted on loader 20 and trailer 24 with a known, fixed spatial relationship to each other and the hook 32 and ring 44, can be used.

If the hook 32 and ring 44 are not vertically aligned, they will not engage. This will be apparent to the driver because first ball 58 will be vertically aligned with second ball 62 only when hook 32 and ring 44 are vertically aligned. The front of the trailer 24 can be adjusted vertically to align hook 32 with ring 44 by operating the lift mechanism 70.

The driver operates the lift mechanism 70 from the cab 22 of the loader 20 through a wireless control apparatus that includes a transmitter 72 installed in the cab 22 and a receiver 74 installed on the trailer 24. The transmitter 72 and receiver 74 can be any conventional wireless transmitter/receiver combination able to control dump valve motor 88 and hitch valve motor 90, as described below. Alternatively, two wireless transmitter/receiver combinations can be utilized—one for operating dump valve motor 88 and the other for operating hitch valve motor 90.

The lift mechanism 70 includes hydraulic power system 76, diesel engine 78, valve body 80, dump cylinder 82, hitch cylinder 84, hitch piston 86, dump valve motor 88, and hitch valve motor 90 (FIG. 4). Valve body 80 contains dump valve 92 and hitch valve 94. The lift mechanism 70 is powered by hydraulic power system 76. The hydraulic power system 76 can be any conventional hydraulic power system, which typically includes a reservoir, a pump, an accumulator, filters, and valves. The pump within the hydraulic power system 76 is operated by conventional diesel engine 78. The receiver 74 operates dump valve motor 88 and hitch valve motor 90. Dump valve motor 88 is used to set dump valve 92 so as to control the flow of hydraulic fluid between hydraulic power system 76 and dump cylinder 82. The flow of hydraulic fluid into and out of dump cylinder 82 causes load container 25 to be raised or lowered.

Hitch valve motor 90 is used to set hitch valve 94 so as to control the flow of hydraulic fluid between hydraulic power system 76 and hitch cylinder 84. The flow of hydraulic fluid into and out of hitch cylinder 84 causes hitch piston 86 to be lowered or raised. Instead of this hydraulic lifting system, a pneumatic or other form of lifting system can be utilized. Also, other forms of pumping systems can be utilized.

When hitch piston 86 is lowered sufficiently for support member 96, at the bottom of hitch piston 86, to engage the ground, further lowering of hitch piston 86 raises the trailer portion 30 and consequently ring 44. The lowering of hitch piston 86 also causes lock control rod 98 to drop. As lock control rod 98 drops, the higher and thinner portion of locking bar activator 100 becomes level with roller 102 at the rear of locking bar 46. As a result of the rearward forces exerted by springs 50a and 50b, locking bar 46 is forced backward against the thinner portion of locking bar activator 100, into its disengaged position.

To engage ring 44 with hook 32, hitch piston 86 is lowered sufficiently to raise ring 44 to the level of gap 36. This can be verified by the driver by observing the vertical alignment of first ball 58 and second ball 62. Once the loader 20 is positioned so that ring 44 has fit through gap 36 and the opening in ring 44 is directly above the tip portion 34 of hook 32, the hitch piston 86 can be raised sufficiently to lower ring 44 around the tip portion 34 of hook 32. The hitch piston 86 can then be completely raised, with gravitational forces keeping ring 44 engaged in hook 32.

The raising of hitch piston 86 causes support member 96 to push lock control rod 98 upward. This forces the lower and wider portion of locking bar activator 100 to come into contact with roller 102 on the rear end of locking bar 46. The force exerted by locking bar activator 100 on roller 102 causes locking bar 46 to be pushed forward into its engaged position, over the tip portion 34 of hook 32.

Alternatively, the ring 44 can be part of the loader portion 28 of the connecting device 26 and the hook 32 can be on the trailer portion 30 of the connecting device 26. Also, the tip portion 34 of the hook 32 can open downward instead of upward.

In operation, the driver will desire to connect the loader 20 to the trailer 24 without exiting from the cab 22 or using an assistant. The driver will roughly align the loader 20 with the trailer 24 laterally and longitudinally by driving the loader 20 so as to roughly align the first ball 58 with the second ball 62. The trailer portion 30 of the connecting device 26 will be lower than the loader portion 28 when the lift mechanism 70 is not engaged.

By using the transmitter 72, the driver will cause the lift mechanism 70 to raise the trailer portion 30 into vertical alignment with the loader portion 28 of connecting device 26. The vertical alignment is determined by observation of first ball 58 and second ball 62. Once the first ball 58 is in vertical alignment with the second ball 62, the driver will complete the lateral and longitudinal alignment, which will leave ring 44 in the gap 36 and directly above the tip portion 34 of hook 32.

The trailer portion 30 is then lowered to drop the ring 44 onto the tip portion 34 of hook 32. The lift mechanism 70 is then disengaged, causing the locking bar 46 to be driven forward, locking the loader 20 to the trailer 24.

To disengage the trailer 24 from the loader 20, the steps are reversed. To dump the debris or other materials carried in trailer 24, the driver operates transmitter 72 to cause the lift mechanism 70 to raise the front of load container 25.

With these operations, the driver is able to engage or disengage the loader 20 from the trailer 24 and to dump the debris or other materials carried in the trailer 24 without an assistant and without exiting from the loader 20. The driver is able to perform functions that previously required more time, an assistant, and, in many cases, a second motorized vehicle. In addition, the driver is able to perform these functions using an easily modified version of a vehicle commonly found at construction sites.

The foregoing and other modifications will become apparent to those skilled in the art from the foregoing description and accompanying drawings. Such modifications are intended to fall within the scope of the appended claims.

What is claimed is:

1. A hauling system particularly adapted for use at a construction site comprising, in combination:
   a self-propelled wheel loader having a cab in which an operator operates said wheel loader;
   a trailer having a front end and a rear end that is not self-propelled;
   connecting means not directly visible to the operator from the cab for releasably securing said wheel loader to said trailer having a tractor portion secured to the rear of said wheel loader and a trailer portion secured to the front of said trailer, and said tractor and trailer portions achieving said releasably securing through a mutual vertical movement produced by a relative vertical movement of said wheel loader and trailer;

locking means for preventing said tractor portion of said connecting means from disengaging from said trailer portion of said connecting means when said locking means is engaged said locking means operating in coordination with and at least in part in response to said mutual vertical movement;

a pair of alignment members each fixed with respect to one of said wheel loader and said trailer, for aligning said wheel loader and trailer portions, said pair of alignment members being visible from within said cab of said wheel loader to permit the operator to determine by a visual inspection of said pair of alignment members form within said cab when said tractor portion is aligned with and can be connected to said trailer portion of said connecting means;

hydraulic lift means mounted on said trailer near its front end to engage the ground and to raise said front end when extended to vertically adjust said trailer including a power source mounted on said trailer and means for connecting said power source to said lift means; and control means for operating said lift means and lock means comprising a transmitter operable form the cab of said wheel loader to transmit a wireless control signal and receiver means mounted on said trailer to receive said wireless signal and produce a control signal to actuate at lest said lift means.

2. A hauling system according to claim 1, wherein said alignment means comprises a tractor mast and a trailer mast, wherein the tractor mast comprises a tractor rod extending generally vertically upward from the tractor and first indicator means located at a fixed height and fixed position with respect to said tractor portion for determining the relative position of the tractor and said trailer mast comprises a trailer rod extending generally vertically upward from the trailer and second indicator means located at a fixed height and fixed position with respect to said trailer portion for determining the relative position of the trailer.

3. A hauling system according to claim 2, wherein the tractor mast is located on the tractor portion of the connecting means.

4. A hauling system according to claim 3 wherein the trailer mast is located on the trailer portion of the connecting means.

5. A hauling system according to claim 2, wherein said first indicator means is located at the top of the tractor rod and said second indicator means is located at the top of the trailer rod.

6. A hauling system according to claim 1, wherein said hydraulic jack comprises an extendable piston that can be lowered and raised, aligned generally vertically, with a support member at the lower end of said piston for engaging the ground.

7. A hauling system according to claim 6, wherein the lowering of the extendable piston disengages said locking means and the raising of the extendable piston engages said locking means.

8. A hauling system according to claim 7, wherein said tractor portion of said connecting means comprises a hook with one end being a tip portion and said trailer portion of said connecting means comprises a ring having an opening through which the tip portion of the hook fits to connect said tractor portion to said trailer portion of said connecting means.

9. A hauling system according to claim 8, wherein said tip portion of said hook extends in a generally vertical direction and said ring is positioned in a generally horizontal plane.

10. A hauling system according to claim 9, wherein said hook further comprises a generally horizontal portion located at a vertical displacement from the tip portion of said hook and a connecting portion that connects the generally horizontal portion to the tip portion.

11. A hauling system according to claim 7, wherein said tractor portion of said connecting means comprises a hook with one end being a tip portion and said trailer portion of said connecting means comprises a ring through which the tip portion of the hook fits to connect said trailer portion to said tractor portion of said connecting means.

12. A hauling system according to claim 11, wherein said tip portion of said hook extends in a generally vertical direction and said ring is positioned in a generally horizontal plane.

13. A hauling system according to claim 12, wherein said hook further comprises a generally horizontal portion located at a vertical displacement from the tip portion of said hook and a connecting portion that connects the generally horizontal portion of the tip portion.

14. A hauling system according to claim 10, wherein said locking means comprises a member movable between a release position where it is clear of said hook and a locking position where said movable member blocks the movement of said ring out of engagement with said hook.

15. A hauling system according to claim 14, wherein said movable member blocks the movement of said ring out of engagement with said hook in said locking position by extending across the opening in said ring and between the generally horizontal portion and the tip portion of said hook.

16. A hauling system according to claim 1, wherein said trailer is a dump trailer.

17. A hauling system particularly adapted for use at a construction site comprising, in combination:

a self-propelled wheel loader having a cab in which an operator operates said wheel loader;

a trailer having a front end and a rear end that is not self-propelled;

connecting means for releasably securing said wheel loader to said trailer and comprising a tractor portion secured to the rear of said wheel loader and a trailer portion secured to the front of said trailer, said connecting means not visible directly from said wheel loader cab by the operator and said tractor and trailer portions achieving said releasably securing through a mutual vertical movement produced by relative vertical movement of said wheel loader and trailer;

locking means for preventing said tractor portion of said connecting means from disengaging from said trailer portion of said connecting means when said locking means is engaged said locking means operating in coordination with and at least in part in response to said vertical movement of said connecting means;

alignment means for aligning said tractor and trailer portions, said alignment means being visible from within said cab of said wheel loader to permit the operator to determine when said tractor portion is aligned with and can be connected to said trailer portion of said connecting means by a visual inspection of said alignment means from within said cab;

hydraulic lift means mounted on said trailer near its front end to engage the ground and to raise said front end when extended to vertically adjust said trailer portion including a power source mounted on said trailer and means for connecting said power source to said hydraulic means; and control means for operating said lift means and lock means comprising a transmitter operable from the cab of said wheel loader to transmit a wireless control signal and receiver means mounted on said trailer to receive said wireless signal and produce a control signal to actuate at least said lift means.

18. A method particularly adapted for use at a construction site for hauling a trailer that is not self-propelled with a self-propelled wheel loader, comprising:

(a) providing a hauling system comprising a self-propelled wheel loader having a cab in which an operator operates said wheel loader, a trailer having a front end and rear end that is not self-propelled and that is separate from said wheel loader, connecting means for releasably securing said wheel loader to said trailer, said connecting means comprising a tractor portion secured to the rear of said wheel loader and a trailer portion secured to the front of said trailer, said connecting means not visible directly from said wheel loader cab by the operator and said tractor and trailer portions achieving said releasably securing through a mutual vertical movement produced by relative vertical movement of said wheel loader and trailer, alignment means for aligning said tractor and trailer portions, said alignment means being visible from within said cab of said wheel loader to permit the operator to determine when said tractor portion is aligned with and can be connected to said trailer portion of said connecting means by a visual inspection of said alignment means form within said cab, hydraulic lift means for vertically adjusting said trailer portion including a power source mounted on said trailer and means for connecting said power source to said hydraulic lift means, and control means for operating said lift means comprising a transmitter operable from the cab of said wheel loader to transmit a wireless control signal and receiver means mounted on said trailer to receive said wireless signal and produce a control signal to actuate said lift means;

(b) moving said trailer and wheel loader together with alignment of said tractor portion and trailer portion by viewing said alignment means from within said wheel loader cab and without exiting said cab; and (c) securing said tractor portion and said trailer portion by said control means and without exiting said wheel loader cab, said securing occurring in coordination with and at least in part in response to said relative vertical movement.

19. The method of claim 18 further comprising dumping material from the trailer without exiting said tractor cab.

20. The method of claim 18 wherein the hauling system further comprises a locking means operated by said control means for preventing said tractor portion of said connecting means from disengaging from sad trailer portion of said connecting means when said locking means is engaged.

* * * * *